March 11, 1924.
J. HEUSSER
MILK CAN COVER
Filed Feb. 21, 1923
1,486,336
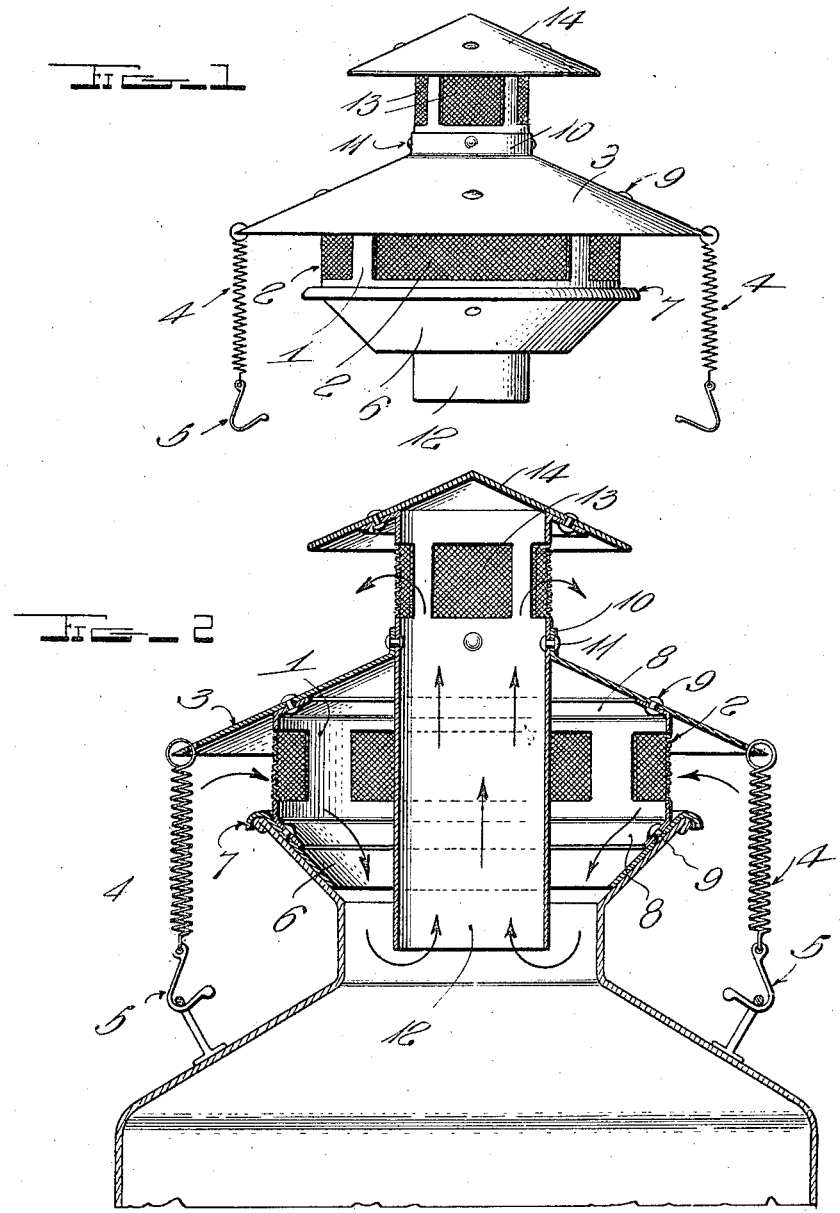
Inventor
Julius Heusser
Witness
By H. B. Willson &co.
Attorneys Patented Mar. 11, 1924.

1,486,336

UNITED STATES PATENT OFFICE.

JULIUS HEUSSER, OF CLEAR LAKE, WISCONSIN.

MILK-CAN COVER.

Application filed February 21, 1923. Serial No. 620,524.

*To all whom it may concern:*

Be it known that I, JULIUS HEUSSER, a citizen of the United States, residing at Clear Lake, in the county of Polk and State of Wisconsin, have invented certain new and useful Improvements in Milk-Can Covers; and I do declare the following to be a full, clear, and exact description of the invention, such as will enable others skilled in the art to which it appertains to make and use the same.

My invention relates to improvements in covers for milk and cream shipping cans and has for its object to provide a simple and inexpensive cover which may be quickly and easily attached or detached and will be effective for permitting the entrance of cool air into the cans and the escape of warm air therefrom, to permit cooling of the milk or cream while it is standing, preparatory to shipment.

With the foregoing in view, the invention resides in the novel subject matter hereinafter described and claimed, the description being supplemented by the accompanying drawing.

Figure 1 is a side elevation of a milk can cover constructed in accordance with my invention.

Figure 2 is a vertical sectional view showing the cover applied to a milk can.

In the drawings above briefly described, the numeral 1 designates a vertically disposed annular wall adapted to contact tightly with and rise from the neck of a milk can, said wall having a plurality of screened air inlet openings 2. A frusto-conical canopy 3 is secured to the upper edge of the wall 1 and extends outwardly beyond said wall to exclude rain from the openings 2 and opposed points of this canopy preferably carry coiled springs 4 having hooks 5 for engagement with the usual handles of the milk can, to retain the entire cover in place. The lower edge of the wall 1 is preferably secured to a downwardly tapered ring 6 having a hooked upper edge 7, said ring being adapted to rest within the flared upper end of the milk can neck with its edge 7 hooking over the upper edge of said neck. In securing the edges of the wall 1 to the canopy 3 and the ring 6, I preferably turn said edges inwardly as indicated at 8 and secure them by rivets 9.

The center of the canopy 3 is formed with an opening and an upstanding flange 10 around the same, this flange being riveted or otherwise secured at 11 to a central warm air escape pipe 12 which passes through the canopy opening and extends to a level below the ring 6. The upper end of the pipe 12 projects above the canopy 3 and is formed with screened air outlet openings 13, said upper end of the pipe being closed by a conical canopy 14 which projects therefrom to prevent the entrance of rain water through the openings 13.

The device is extremely simple and inexpensive, yet will be very efficient for cooling the contents of milk and cream cans, preparatory to shipment, and it will be obvious that while free circulation of air is permitted, there is no danger whatever of flies or other insects, or any foreign matter entering the cans. Moreover, the hooked edge 7 of the ring 6, and the extended edge portions of the canopies 3 and 14, prevent rain from running into the cans.

As excellent results have been obtained from the details disclosed, I prefer that these details be followed. However, within the scope of the invention as claimed, numerous minor changes may be made.

I claim:

1. A milk can cover comprising an upstanding annular wall adapted to rest on and rise from a neck of a milk can, said wall having screened air inlet openings, a frusto-conical canopy secured to the upper edge of said wall and extending outwardly beyond said wall to exclude rain from said screened openings, said canopy having a central opening, an upright heat escape pipe secured in said openings and extending from a point below said wall to a point above said canopy, the upper end of said pipe having screened air escape openings above the canopy, and a second canopy closing the upper end of said escape pipe, said second canopy extending outwardly beyond said pipe to prevent the entrance of rain through its screened openings.

2. A structure as specified in claim 1; together with a downwardly tapered ring to which the lower edge of said wall is secured, said ring being adapted to rest upon the flared upper end of the milk can neck and having its upper edge turned downwardly to hook over the upper edge of said neck.

In testimony whereof I have hereunto affixed my signature.

JULIUS HEUSSER.